Patented May 9, 1950

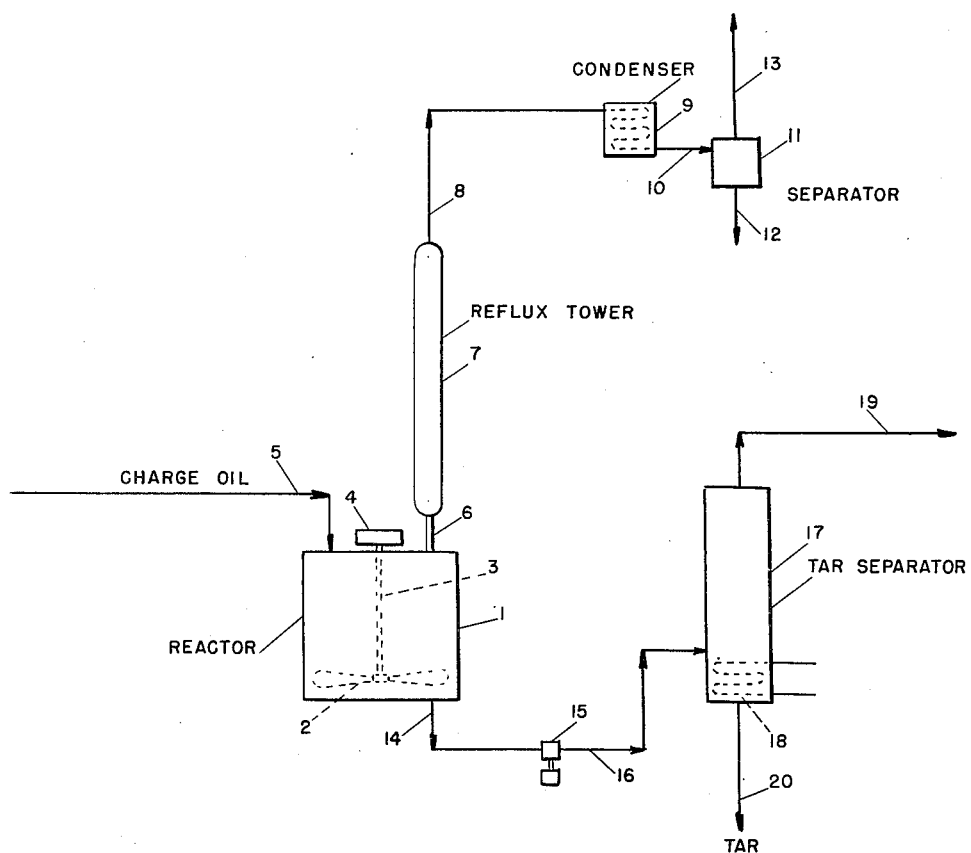

2,507,220

UNITED STATES PATENT OFFICE 2,507,220

CATALYTIC CONVERSION OF HYDROCARBONS

Harry Louis Pelzer, Steger, Ill., assignor to Sinclair Refining Company, New York, N. Y., a corporation of Maine Application June 3, 1947, Serial No. 752,261

6 Claims. (Cl. 196—52)

The present invention relates to the pyrolytic conversion of hydrocarbons and, more particularly, to pyrolytic conversion processes whereby heavier, higher boiling hydrocarbons are cracked in the presence of a catalyst for the production of lighter, lower boiling hydrocarbons, for instance, hydrocarbons within the motor fuel or gasoline range.

The invention provides an improved process especially adapted to the production of gasoline type distillates having improved anti-knock characteristics and which comprises subjecting a body of the oil to be cracked, in substantially liquid phase, to a cracking temperature while admixed with anhydrous ammonium fluoride.

Various catalysts have been proposed for use in the cracking of hydrocarbon oils. The more commonly used catalysts for this purpose are various metals, metal salts and metal oxides which are solids under the conditions of use. The use of such catalysts in hydrocarbon conversion processes has been accompanied by various conveying and separating problems, as well as the troublesome burden of periodically removing from the catalysts heavy tarry material, or coke, deposited thereon during the conversion reaction.

More recently, extensive research has been directed to the discovery of a cracking catalyst which may be more economically handled and which does not present the troublesome problem of regeneration and the development of a hydrocarbon cracking process in which such catalyst may be effectively used.

My present process provides an improved hydrocarbon cracking process in which anhydrous ammonium fluoride is used as a catalyst admixed with a substantial body of the oil, maintained at the cracking temperature. The process is applicable to either batch or continuous type operation.

In either type of operation, the catalyst may be charged to the cracking zone in admixture with the oil, or may be separately added. The body of oil in the conversion zone is, with advantage, continuously agitated and the catalyst may be added to the body of oil from time to time, or continuously in such amounts as to maintain in the body of oil the desired concentration of the catalyst.

The ammonium fluoride will sublime in the presence of the oil at temperatures of about, or below, the active cracking temperatures of the oils. The resultant vaporized catalyst is intimately admixed with the oil by the agitation and the catalyst passed from the cracking zone as vapors together with the hydrocarbon vapors resulting from the cracking operation.

In accordance with my improved process, the body of oil being cracked is maintained at a temperature within the range of about 650° to 750° F., the optimum temperature depending upon the characteristics of the particular oil being cracked and the depth of cracking desired. In the cracking of a gas oil fraction, for instance, temperatures of about 690° to 700° F. are usually particularly advantageous. The pressure maintained in the cracking zone is, with advantage, approximately atmospheric, or only sufficiently above atmospheric to insure the passage of the effluent vapors through auxiliary fractionating and condensing equipment.

The proportion of catalyst used is, likewise, subject to some variation depending upon the character of the oil being processed and other operating conditions. Usually, proportions within the range of about 0.5 to about 5%, based on the weight of the oil, will be found effective.

The process will be described and illustrated with reference to the accompanying drawing which represents conventionally a flow diagram of a particularly advantageous embodiment of my invention.

In the drawing, the apparatus indicated by the reference numeral 1, is an enlarged, closed vessel adapted to be heated by conventional means, not shown in the drawing, and to hold a considerable volume of oil. The vessel 1 is equipped with a conventional stirring device 2, supported by shaft 3 and adapted to be driven by any convenient source of power through pulley 4.

The vessel 1 is filled about two-thirds full with charge oil free from moisture, and having admixed therewith a relatively small amount of anhydrous ammonium fluoride through line 5. Oil vapors resulting from the heating and cracking reaction, together with catalyst vapors, pass from the vessel 1 through line 6 to reflux tower 7, in which heavier hydrocarbons are condensed and returned to the cracking vessel through line 6.

Uncondensed vapors pass from the reflux tower through line 8 to condenser 9 in which the overhead vapors from the reflux tower are condensed and from which they pass through line 10 to separator 11. Condensed hydrocarbons are separated from the incondensible vapors and gases in the separator 11 and are withdrawn therefrom through line 12 to storage. Uncondensed vapors and gases are withdrawn from the upper portion of the separator through line 13. Where desired, the reflux tower 7 may be supplemented by other conventional fractionating means, not shown.

Hydrocarbon residuum is withdrawn from the lower portion of vessel 1 through line 14 by means of pump 15 and is passed from thence through line 16, to tar separator 17. The residuum is, with advantage, heated by steam coils, or the like, 18, positioned in the lower portion of the tar separator, whereby the lighter fractions of the residuum are vaporized and pass off through line 19. Unvaporized residuum is withdrawn from the tar separator through line 20.

The process, as previously noted, may be carried out batch-wise or as a continuous system. In batch operation, the vessel 1 is filled with the charge of oil admixed with the ammonium fluoride, the oil treated as herein described, the residuum thereafter withdrawn to the tar separator and the cracking vessel 1 recharged.

In continuous operation, the vessel 1 may be filled about two-thirds full with the mixture of charge oil and ammonium fluoride, heated to the desired temperature and thereafter fresh charge oil and ammonium fluoride are continuously supplied to the vessel and vapors and residuum withdrawn therefrom at rates adapted to maintain substantially equilibrium conditions in the cracking reactor.

In either type of operation it is usually advantageous to preheat the charge oil prior to introduction to the cracking chamber.

The ammonium fluoride passing from the reaction chamber with the effluent hydrocarbon vapors may be recovered from the vapors by known means and returned to the reaction zone, for instance, the catalyst present in the effluent vapors may be returned to the reaction zone with reflux condensate from the reflux tower by maintaining the top temperature of the tower below the solidifying temperature of the catalyst, say, at approximately 600° F., or lower.

A primary advantage of my present process is that the catalyst is separated from any tarry residuum, or coke, resulting from the cracking reaction and may be repeatedly reused without the customary regeneration, necessary where a catalyst which is a solid at the reaction temperature is used. The process has the further advantages of high yield and improved characteristics of the resultant lower boiling product.

I claim:

1. The method of cracking heavier, higher boiling hydrocarbons to produce lighter, lower boiling hydrocarbons with a catalyst consisting solely of anhydrous ammonium fluoride which comprises admixing the anhydrous ammonium fluoride catalyst with a hydrocarbon while said hydrocarbon is in liquid phase and then cracking the mixture at a temperature in the range of about 650° F. to about 750° F. at about atmospheric pressure for a period of time necessary to effect the desired conversion.

2. In a method according to claim 1, the additional step of taking off a vapor mixture containing the hydrocarbon and anhydrous ammonium fluoride and separating the ammonium fluoride therefrom by fractional distillation.

3. A method according to claim 1 wherein the proportion of anhydrous ammonium fluoride catalyst is in the range of 0.5% to 5% by weight on the hydrocarbon.

4. The method of cracking heavier, higher boiling hydrocarbons to produce lighter, lower boiling hydrocarbons with a catalyst consisting solely of anhydrous ammonium fluoride which comprises admixing the anhydrous ammonium fluoride with a hydrocarbon while said hydrocarbon is in liquid phase, cracking the mixture at a temperature in the range of about 650° F. to about 750° F. at about atmospheric pressure, taking off a vapor mixture of hydrocarbon and ammonium fluoride, condensing the heavier hydrocarbons and returning said hydrocarbons to the reaction zone and passing the uncondensed vapors to a separating zone from which ammonium fluoride catalyst is removed.

5. A method according to claim 4 wherein a proportion of anhydrous ammonium fluoride catalyst employed is in the range of 0.5% to 5% by weight on the hydrocarbon.

6. The method according to claim 4 wherein the vapor mixture of hydrocarbon and ammonium fluoride is subjected to a reflux condensation at a temperature whereby the catalyst is solidified, then returning the reflux condensate and solidified catalyst to the reaction zone.

HARRY LOUIS PELZER.

REFERENCES CITED

The following references are of record in the file of this patent:

UNITED STATES PATENTS

| Number | Name | Date |
|---|---|---|
| 1,501,014 | McAfee | July 8, 1924 |
| 1,647,445 | Hall | Nov. 1, 1927 |
| 2,221,952 | Pier et al. | Nov. 19, 1940 |
| 2,363,242 | Harvey et al. | Nov. 21, 1944 |

FOREIGN PATENTS

| Number | Country | Date |
|---|---|---|
| 277,974 | Great Britain | Dec. 6, 1928 |
| 279,410 | Great Britain | Dec. 6, 1928 |
| 500,282 | Great Britain | Feb. 6, 1939 |
| 20,279 of 1934 | Australia | Dec. 5, 1935 |